US012687422B2

(12) United States Patent
Jones et al.

(10) Patent No.: US 12,687,422 B2
(45) Date of Patent: Jul. 21, 2026

(54) SMART VEHICLE FLOOR SENSOR

(71) Applicant: GM Cruise Holdings LLC, San Francisco, CA (US)

(72) Inventors: Matthew Jones, Oakland, CA (US); Nigel Rodrigues, Palo Alto, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 936 days.

(21) Appl. No.: 17/947,374

(22) Filed: Sep. 19, 2022

(65) Prior Publication Data

US 2024/0094045 A1      Mar. 21, 2024

(51) Int. Cl.

| | |
|---|---|
| *G01G 19/08* | (2006.01) |
| *G01G 19/44* | (2006.01) |
| *G01S 13/86* | (2006.01) |
| *G01S 17/86* | (2020.01) |

(52) U.S. Cl.
CPC ............. *G01G 19/08* (2013.01); *G01G 19/44* (2013.01); *G01S 13/867* (2013.01); *G01S 17/86* (2020.01)

(58) Field of Classification Search
CPC ...... G01G 19/08; G01G 19/44; G01S 13/867; G01S 17/86; B60W 40/13; B60W 50/14; B60W 2040/0881; G06V 20/59
See application file for complete search history.

(56) References Cited

U.S. PATENT DOCUMENTS

| | | | |
|---|---|---|---|
| 9,691,240 B2 | 6/2017 | Bradford | |
| 10,192,194 B2 | 1/2019 | Bernhardt et al. | |
| 10,552,788 B1 | 2/2020 | Hahn et al. | |
| 11,300,662 B1 * | 4/2022 | Milton | G01S 17/06 |
| 2009/0143923 A1 * | 6/2009 | Breed | G06V 30/194 |
| | | | 701/1 |
| 2018/0094966 A1 * | 4/2018 | Buether | B62D 53/068 |
| 2019/0066038 A1 * | 2/2019 | O'Brien | G06Q 10/0832 |
| 2019/0143872 A1 * | 5/2019 | Gil | B25J 9/1682 |
| | | | 211/86.01 |
| 2021/0394645 A1 * | 12/2021 | McFarland, Jr. | B60Q 1/343 |
| 2022/0138888 A1 * | 5/2022 | Wiesenberg | G07C 5/0825 |
| | | | 705/5 |
| 2022/0374834 A1 * | 11/2022 | Lundeen | B60P 1/6409 |

* cited by examiner

*Primary Examiner* — Ricky Go
(74) *Attorney, Agent, or Firm* — Honigman LLP; Matthew H. Szalach

(57) ABSTRACT

Methods and apparatus consistent with the present disclosure may use a plurality of force sensing devices that allow a computer of an autonomous vehicle (AV) to identify locations within the AV where particular objects reside. These force sensing devices may allow the AV computer to identify how much a particular object weights and identify whether an object has moved based on a location where a particular amount of weight currently resides versus a location where that weight previously resided in the AV. Weight information combined with other sensor data (e.g. camera or LIDAR data) may allow the AV computer to identify whether a particular object is a person or a package. The AV computer may also validate that certain driving rules are enforced, such that persons or packages are being moved safely and correctly in the AV.

20 Claims, 8 Drawing Sheets

$$\Sigma Fz = 0 \quad \therefore \quad W = Ra + Rb + Rc + Rd$$
$$\Sigma Mx = 0 \quad \therefore \quad W{*}y = L{*}(Rb + Rc)$$
$$\Sigma My = 0 \quad \therefore \quad W{*}x = L{*}(Rd + Rc)$$

SMART VEHICLE FLOOR SENSOR

BACKGROUND

1. Technical Field

The present disclosure generally relates to identifying locations where objects reside in a vehicle. More specifically, the present disclosure relates to tracking objects by monitoring weights of those objects.

2. Introduction

An autonomous vehicle (AV) is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

In the future, autonomous vehicles (AVS) may perform services that are currently performed by human drivers. Human drivers currently perform services that include picking up people and driving those people to a destination or delivering packages to recipients. Human drivers naturally understand contextual information and requirements about the service they provide. For example, a human driver can identify that a person has moved into a seat of their vehicle and closed the door of the vehicle. Human drivers also are aware of packages that they must deliver as part of their service. When delivering a package, a human driver may read addresses printed on a package or may use a scanning device to identify information about a package that they are delivering.

While humans are naturally aware of the contextual information regarding the service they provide, computers of AVs that perform the same type of functions are not aware of this contextual information. Because of this, the computers that control the operation of an AV must be programmed to operate in a fashion that is consistent with the requirements of performing a service. Such requirements include being aware of the status of passengers or packages that the AV is moving from one place to another. This means that new forms of sensor systems need be developed such that AV control computers can monitor that passengers or packages are being delivered to destinations safely and accurately.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
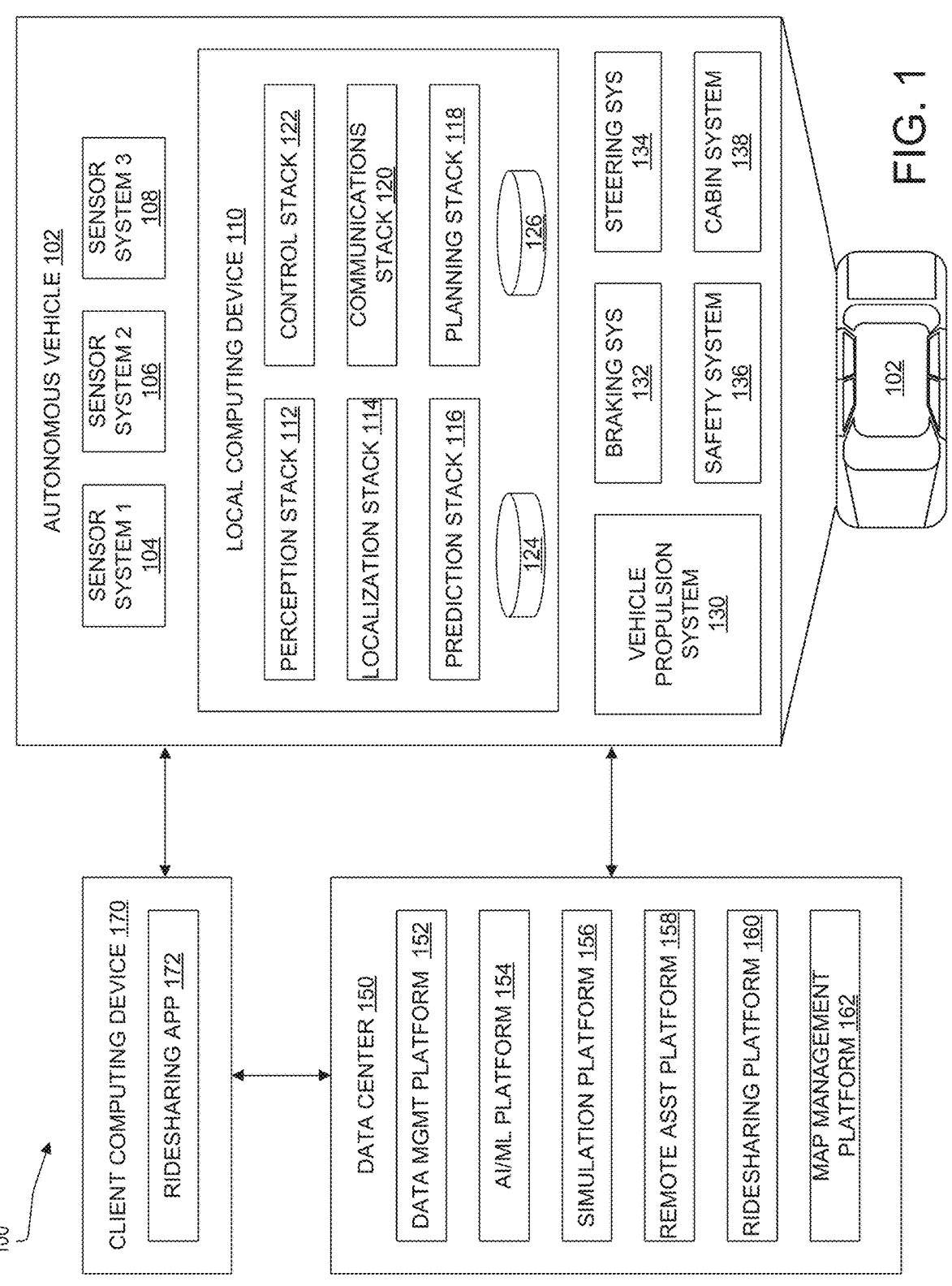
FIG. 1 illustrates an example system environment that can be used to facilitate autonomous vehicle (AV) dispatch and operations, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

While AVs have many different types of sensing apparatus that may include cameras, radio detection and ranging (radar) devices, or light detection and ranging (LIDAR) devices, additional types of sensors may be used to collect data about passengers or packages that the AV is moving to a destination. Methods and apparatus consistent with the present disclosure may use a plurality of force sensing devices that allow a computer of an AV to identify locations within the AV where particular objects reside. These force sensing devices may allow the AV computer to identify how much a particular object weights and identify whether an object has moved based on a location where a particular amount of weight currently resides versus a location where that weight previously resided in the AV. Weight information combined with other sensor data (e.g. camera or LIDAR data) may allow the AV computer to identify whether a particular object is a person or a package. The AV computer may also validate that certain driving rules are enforced. A set of AV driving rules may be used to make sure that persons do not ride in a cargo area of the vehicle, may guarantee that passengers wear seat belts, may track a package as it is being delivered, or may validate that an object is securely held in a particular location of the AV. Weight measurement devices may monitor whether persons or other objects are occupying a seat of the AV or may identify that a package is contained within a cargo area of the AV.

A computer of the AV may also use this sensor data to identify patterns associated with persons or other objects located within the vehicle. Such patterns may include identifying that a weight on a seat is above a threshold value and that this may indicate that two people are currently occupying a particular seat. For example, when a weight on a seat exceeds 250 pounds, the AV computer may evaluate camera data or LIDAR data to identify whether one person is sitting on the lap of another person in the vehicle. Such a determination could result in message being provided to the persons indicating that only one person is authorized to occupy a single seat in the AV. Another pattern that the AV computer may identify may include identifying that a pet dog is moving around. Yet another pattern may relate to the movement of persons toward or away from a door or window of the vehicle and such patterns may be used to identify that the person appears to be getting ready to exit the vehicle. In an instance when a wheelchair has been placed in the AV, a shifting or movement of the center of mass of the wheelchair may allow the AV to identify that the wheelchair is not properly strapped into a stationary location within the vehicle. Patterns of activity may also include identifying that motions of a person are consistent with operations that are performed when a person cleans the vehicle. Here motions associated with wiping windows or moving an elongated object along the floor or seats of the vehicle are consistent with someone cleaning the vehicle (e.g. window washing or vacuuming).

FIG. 1 is a diagram illustrating an example autonomous vehicle (AV) environment 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill in the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models;

evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 8.

Figure 2:
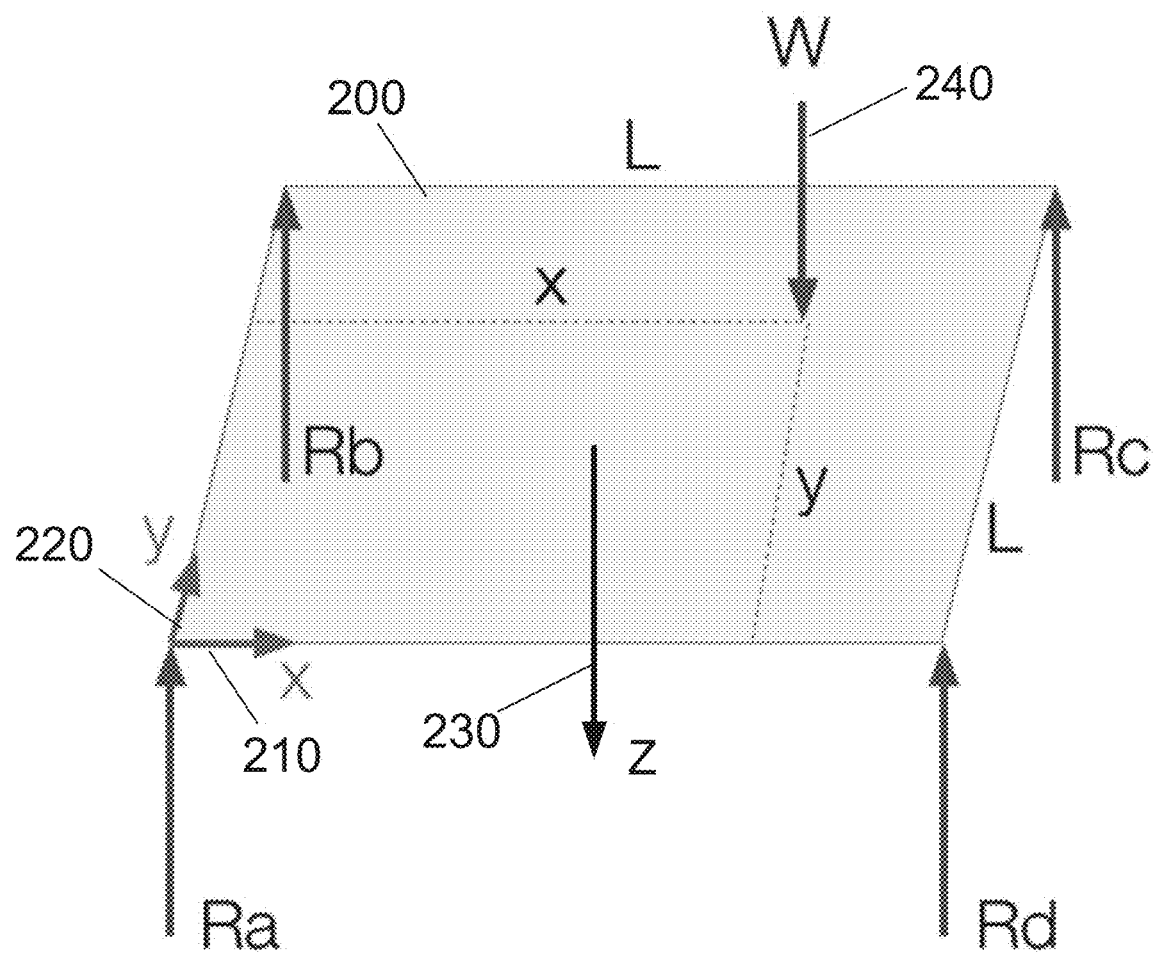
FIG. 2 illustrates a tile that may be used to identify a force or weight applied to the tile, according to some examples of the present disclosure.

FIG. 2 illustrates a tile that may be used to identify a force or weight applied to the tile. Tile 200 of FIG. 2 may include multiple sensors that may be located at the corners of tile 200. This tile may have a square shape that has four sides of length L. These sensors may be used to identify forces associated with vectors Ra, Rb, Rc, and Rd. These sensors may measure forces associated with vectors Ra, Rb, Rc, and Rd may sense forces in three directions that include an X direction 210, a Y direction 220, and a Z direction 230. A computer may collect force data from these sensors and may use that force information to identify sheer stresses (or moments) in the X direction 210 and the Y direction 220 as well as forces in the Z direction that may correspond to a weight W of an object placed on tile 200.

Moments and forces measured in the X direction 210, Y direction 220, and the Z direction 230 may be used to identify a weight W of the object using force equations. These force equations may also identify a location x, y on tile 200 where weight W is focused (as weight vector 240 identifies). The equations shown in FIG. 2 indicate that a sum of all forces sensed by the sensors in the Z direction equal zero $\Sigma Fz=0$, where W equals or is proportional to the sum of forces in the Z direction $W=Ra+Rb+Rc+Rd$. Other equations in FIG. 2 indicate that the sum of all moments in the X and the Y direction also equal zero: $\Sigma Mx=0$ and $\Sigma My=0$. Evaluations of these moments may include calculating values of stress forces in the X and Y directions using Equations 1 and 2.

$$W^*y=L^*(Rb+Rc) \qquad \text{Equation 1}$$

$$W^*x=L^*(Rd+Rc) \qquad \text{Equation 2}$$

A vehicle or an autonomous vehicle (AV) may include multiple tiles located at a floor area and/or cargo at a carrying area of the vehicle (e.g. trunk). Furthermore, seats located within the vehicle may be equipped with force sensors. Such an arrangement of force sensors may allow a computer of an AV track where certain objects are located in the vehicle and may allow the computer to identify whether objects have moved in the vehicle. These force sensors combined with other sensed data may allow the vehicle computer to identify types of objects. This other sensed data may have been received from a camera or a light detecting and ranging camera (LIDAR) device. Various determinations may be made by the vehicle computer by evaluating force distribution data and data collected from other sensors. For example, an analysis of camera data may identify that an object located in a passenger seat includes an infant in a car seat or may be used to identify that an object on the passenger seat is a bag of items.

Figure 3:
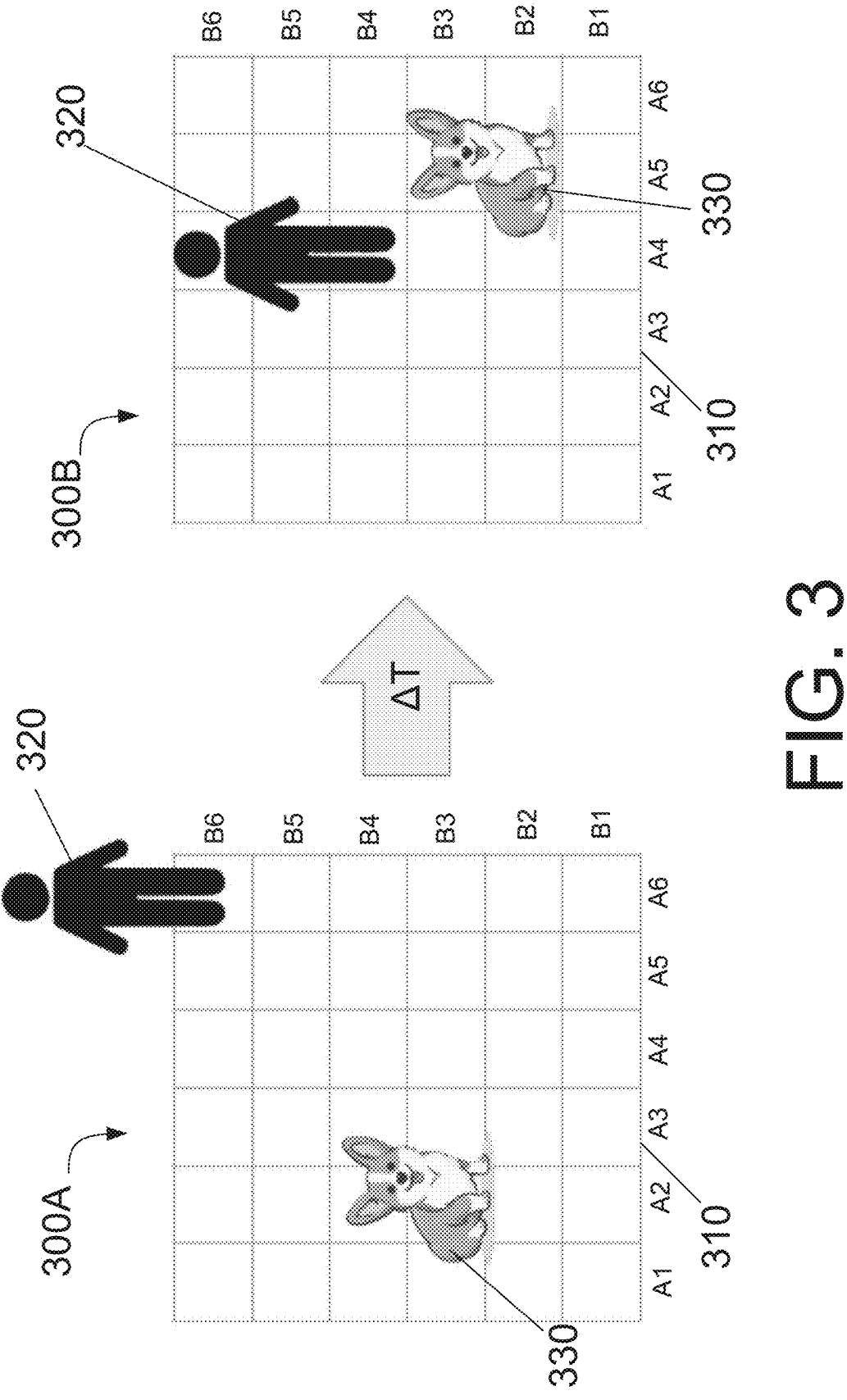
FIG. 3 illustrates a set of force sensing tiles used to sense the locations where objects within a vehicle are located at different moments in time, according to some examples of the present disclosure

FIG. 3 illustrates a set of force sensing tiles used to sense the locations where objects within a vehicle are located at different moments in time. FIG. 2 includes two images 300A and 300B of a set of force sensing tiles 310. Images 300A and 300B show locations where a person 320 and a dog 330 located in the vehicle at different moments in time. The tiles of FIG. 3 form a grid where each respective tile may be identified using reference designators A1, A2, A3, A4, A5, and A6 in combination with reference designators B1, B2, B3, B4, B5, and B6. A particular tile may be identified by combining these designators in the form of AX-BY, where values of X and Y vary from 1 to 6. As such, the person 320 is located at tile A6-B6 and dog 330 is located at tile A2-B3 in image 300A. Image 300B indicates that after some amount of time $\Delta T$ that person 320 is located at tile A4-B4 and that dog 330 is located at tile A5-B2. Here again a type of object (e.g. person 320 or dog 330) may be identified by a vehicle computer using other types of sensed data (e.g. camera or LIDAR data).

Because of this, the vehicle computer may be able to identify whether a particular object is moving, has moved, or is stationary in the vehicle. In turn, the computer may be able to track the motion of objects when making determinations regarding whether motions of particular objects correspond to a set of vehicle driving rules.

Figure 4:
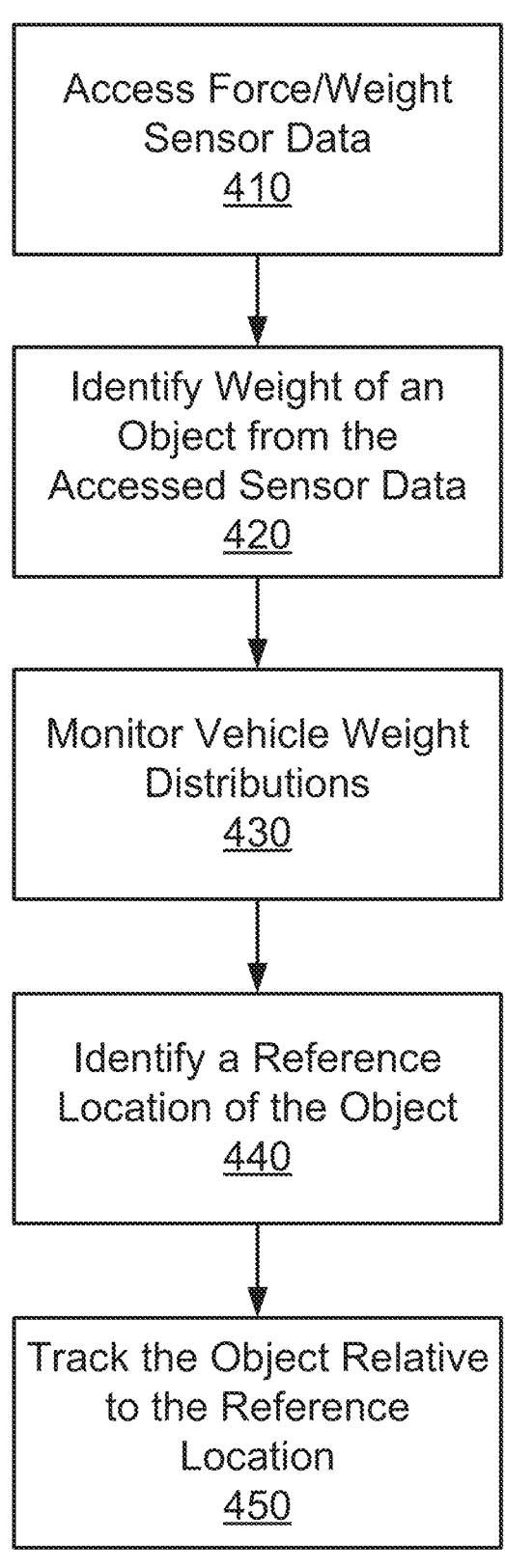
FIG. 4 illustrates actions that may be performed when the location of an object is identified and tracked using force or weight sensors located in a vehicle, according to some examples of the present disclosure.

FIG. 4 illustrates actions that may be performed when the location of an object is identified and tracked using force or weight sensors located in a vehicle. FIG. 4 begins with step 410 where force or weight sensor data is accessed. This may include accessing force data and performing equations to identify a weight of an object as discussed in respect to FIG. 2. From the force/weight sensor data accessed in step 410, a weight of the object may be identified in step 420, and then weight distributions of the object may be monitored in step 430. A particular object may have its weight distributed on more than one tile or may have its weight distributed on a seat of the vehicle and on one or more tiles of the vehicle. For example, a person may have most of their weight centered on a passenger seat of the vehicle while their left foot is resting on a first tile and while their right foot is resting on a second tile. This means that the person's weight would be distributed over three locations, the seat, the first tile, and the second tile.

Next, in step 440 a reference location may be associated with the object. For example, a center of mass of the person sitting in the passenger seat may be identified as being the reference location. Alternatively, or additionally, an object that has a center of mass located off center of a tile (as the weight W arrow of FIG. 2 illustrates) may be the reference location of the object. After step 440 any movement of the object may be tracked relative to the reference location in step 450.

By tracking movement of the object, a current location of the object may be identified relative to the reference location. This may allow a processor to identify that a person moved from a first passenger seat to another passenger seat of the vehicle or this may allow the processor to identify whether the center of mass of another object has shifted. While traveling in a vehicle, even inert objects (e.g. a package or bag of groceries) may slide or shift around as the vehicle accelerates, deaccelerates, or turns. The tracking of the object may allow the processor to make determinations relating to the object motion. In certain instances, object motion may be expected, where in other instances that object motion may be unexpected or non-consistent with a set of motion rules of the vehicle.

As mentioned above, other sensor data (e.g. camera or LIDAR data) may be used to identify an object type to associate with the object. Weight and this other sensor data may be used to identify that an infant or child occupying a passenger seat has moved or been moved. Since infants and children should not move around a vehicle when that vehicle is being driven, an identification indicating that the infant or child is moving when the vehicle is being driver could be in violation of a driving rule.

Another type of driving rule may indicate an amount of acceptable shift (threshold shift) to associate with a particular type of object. Such a rule could indicate that it is unacceptable for an object to shift more than 2 cm, and in an instance when that object shifts more than that 2 cm could result in a computer of an AV issuing a warning, providing a message, or stopping such that a corrective action can be taken.

Figure 5:
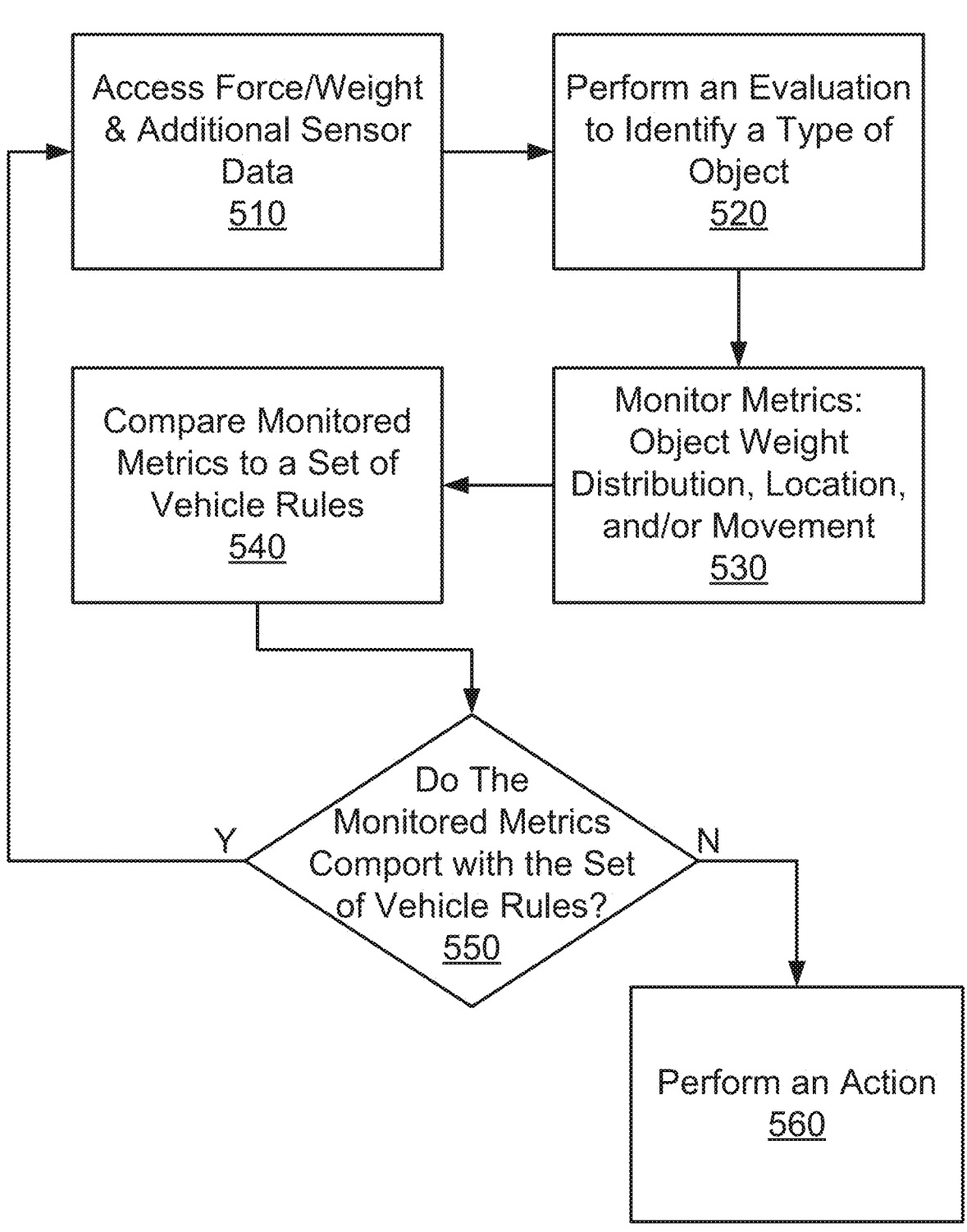
FIG. 5 illustrates a series of actions that may be performed when force, weight, and/or additional sensor data is evaluated, according to some examples of the present disclosure.

FIG. 5 illustrates a series of actions that may be performed when force, weight, and/or additional sensor data is evaluated. This may include accessing force/weight data and additional data in step 510 after which an evaluation may be performed to identify an object type to associate with the object in step 520. Here again, exemplary object types include a person, an infant, a child, or an inert object (e.g. a package or bag of groceries). Next, in step 530, metrics that may include weight distributions of the object, locations of the object, and/or movement of the object may be monitored. These monitored metrics may be compared to a set of vehicle rules at step 540. These rules may be similar to the driving rules discussed with respect to FIG. 4. As such, monitored metrics may be used to make sure that individuals within the vehicle are behaving according to the set of rules or to identify that inert objects are retained securely. Determination step 550 may then identify whether the monitored metrics comport to the set of vehicle rules, when yes, program flow may move back to step 510 where the force/weight and/or other sensor data is accessed. When determination step 550 identifies that the monitored metrics do not comport to the set of vehicle rules, program flow may move to step 560 where an action is performed. This action may include providing a message to occupants of the vehicle, sending a message to a third party, or may result in the computer of the vehicle changing how the vehicle is driving (e.g. stopping the vehicle, slowing down the vehicle, or performing some other action).

Figure 6:
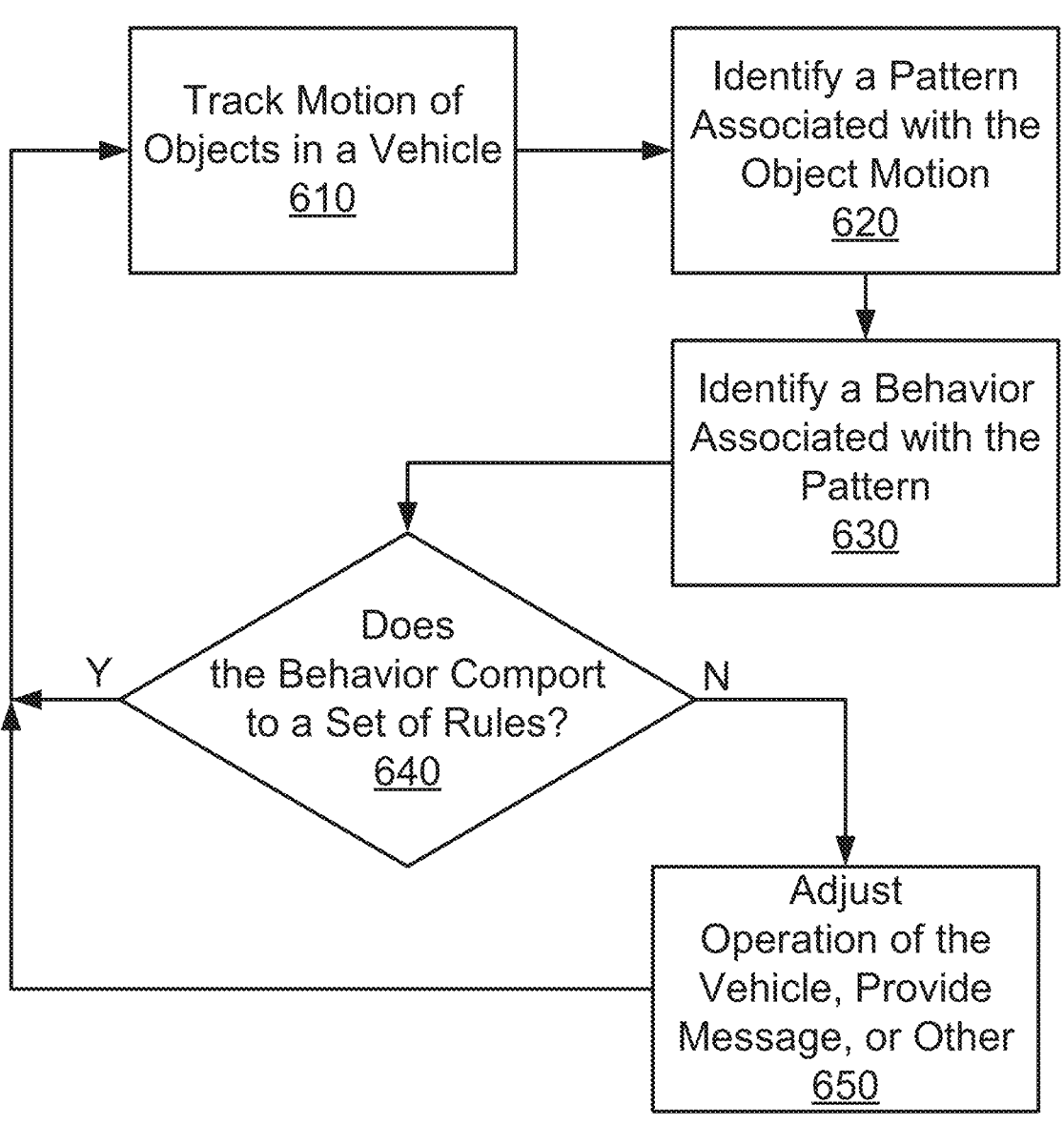
FIG. 6 illustrates a series of actions that may be performed by a computer that monitors objects located within a vehicle, according to some examples of the present disclosure.

FIG. 6 illustrates a series of actions that may be performed by a computer that monitors objects located with a vehicle. FIG. 6 begins with step 610 where motion of an object within the vehicle is monitored, a pattern may be identified from the tracked motions of the object in step 620, and a behavior to associate with the pattern may be identified in step 630. Determination step 640 may then identify whether the behavior comports to a set of rules, when no program flow may move back to step 610 where the motions of the object are continued to be monitored. When determination step 640 identifies that the motions of the object do not comport to the set of rules, program flow may move to step 650 where messages may be provided to occupants or third parties, operation of the vehicle may be adjusted, or other actions may be performed based on the motions not comporting to the set of rules.

The pattern of motion identified in step 620 may be associated with the behavior identified in step 630 based on sets of data collected over time by different computers of different AVs. Motion data collected by different AV computers may have been sent to a central data repository and evaluations of that data may have been performed that associated certain motion patterns with specific types of actions or behaviors. As mentioned above, patterns of previous cleaning sessions may be used to identify a current pattern of activity as being a cleaning activity.

An example of a pattern of behavior includes a dog that is moving around the vehicle. Here weight measurements and camera or LIDAR data may be used to identify that a moving object is the dog and this data may be used to track the dog as it moves around the vehicle. Since it may be a violation of safe driving rules, to allow the dog to move around in the vehicle, a message may be provided to occupants of the vehicle that the dog should be placed in a carrier or at a location where it will not move. Other patterns may be identified by the computer of the AV. As mentioned above these patterns could allow the computer to identify that an occupant appears to be exiting the vehicle, or that an object is not properly secured in the AV.

Figure 7:
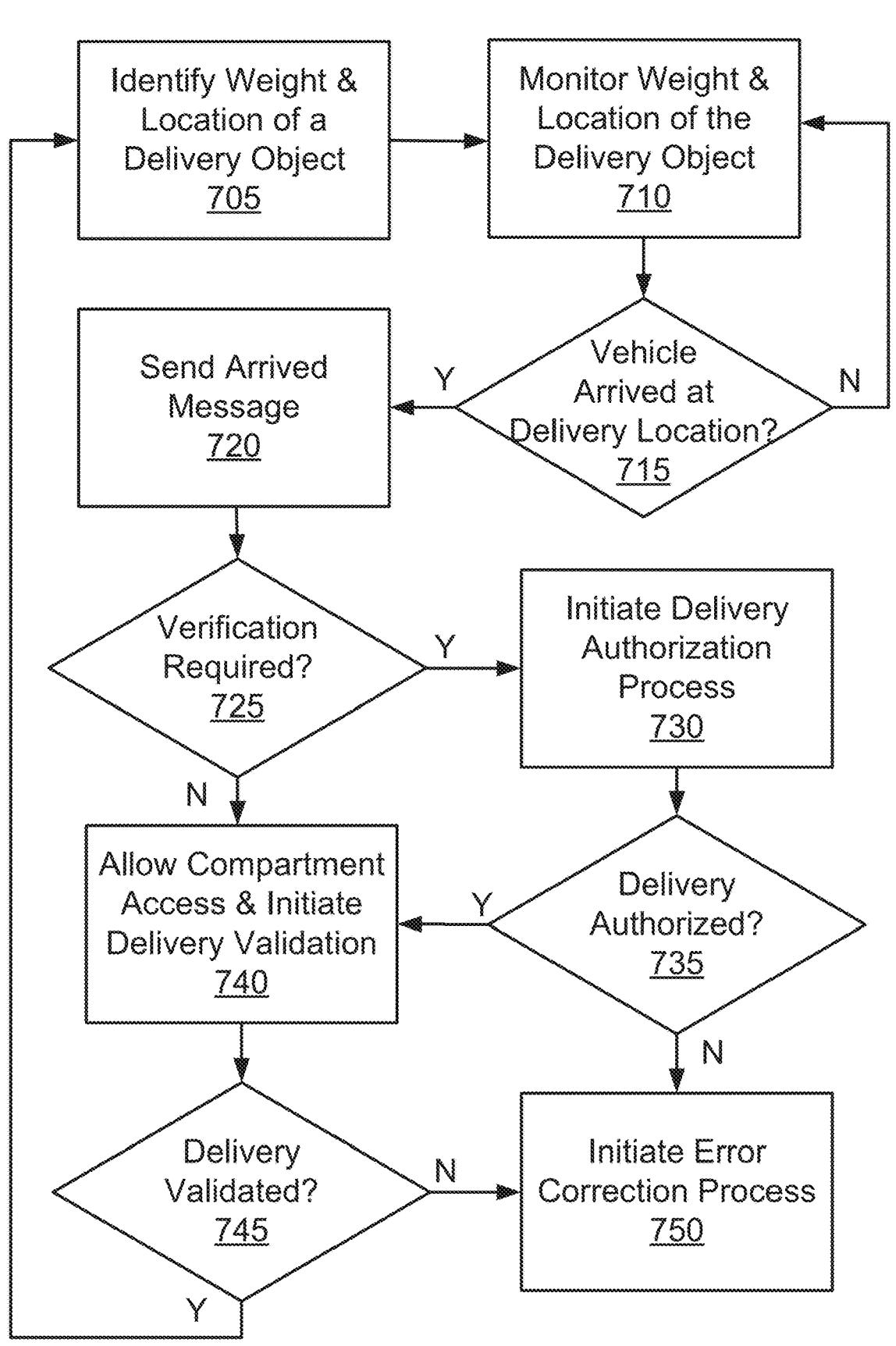
FIG. 7 illustrates a series of actions that may be implemented by a computer that monitors objects when those objects are delivered to a recipient, according to some examples of the present disclosure.

FIG. 7 may be implemented by a computer that monitors objects when those objects are delivered to a recipient. An object that is to be delivered may be placed in a compartment or on a shelf that has one or more weight tiles. Once the object is placed in the vehicle, a weight and location of an object being delivered may be identified in step 705. Camera or LIDAR data may be used to identify a type of object and to identify that the object has been placed in the vehicle. The process of delivering an object may include capturing data with a scanner, bar code reader, radio frequency identifier (RFID) reader, or camera. This information may be used to identify the object and may also identify an address and recipient to which the object should be delivered.

The weight and of the location object may be monitored in step 710 as the object is being delivered to the recipient. Determination step 715 may identify whether the vehicle has reached a delivery location, when no, program flow may move back to step 710 where the monitoring of the object is continued. When determination step 715 identifies that the vehicle has reached the delivery location, program flow may move to step 720 where an "arrived" message may be sent to a computing device of the recipient, for example, by sending a text or audio message to a cell phone of the recipient. Next, determination step 725 may identify whether a verification is required to verify the identity of the recipient, when yes, program flow may move to step 730 where an identity of the recipient may be performed. This may include the recipient providing a signature, holding their cell phone in proximity to a scanner or RFID reader, or the recipient sending a text message to indicating that they are ready to receive the object. When the recipient's cell phone is used to verify the identity of the recipient, an image of the recipient's cell phone display may provide text information that a computer of the AV may interpret. When an RFID reader is used, data may be exchanged between the recipient's cell phone and the RFID reader. Here either the text information or data received by the RFID scanner may be used to validate the identity of the recipient in determination step 735. The delivery process may include capturing data that was previously captured with the scanner, bar code reader, RFID reader, or camera when the package was placed in the vehicle. As such determination step 735 may identify whether the current recipient is a correct recipient and may also identify that the correct object is being delivered to that correct recipient. When recipient information does not match the delivery information, determination step 735 may identify that the delivery is not authorized. When determination step 735 identifies that the delivery is not authorized, program flow may move to step 750 where an error correction process is initiated. Such an error correction process may prevent packages from being delivered to incorrect recipients or may prevent an incorrect package from being delivered to a recipient expecting another package.

Either when determination step 725 identifies that a verification should not be performed or when determination step 735 identifies that the delivery has been authorized, program flow may move to step 740 where access to the compartment is allowed. Step 740 may also include validating the delivery. Determination step 745 may then validate whether the delivery has been successful. This may include receiving a signature from the recipient or receiving information from the cell phone of the recipient confirming that the object has been received by the recipient.

Figure 8:
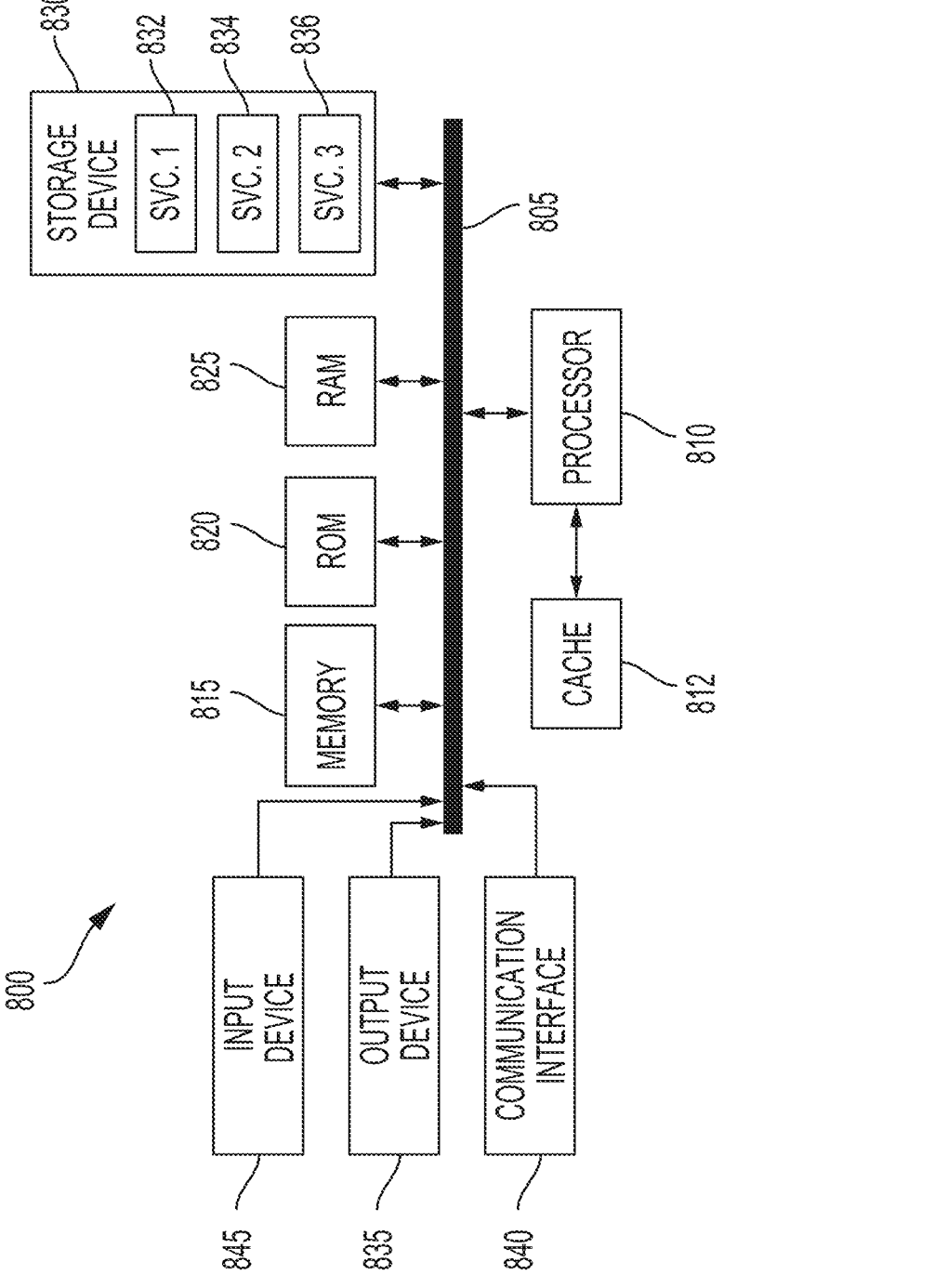
FIG. 8 illustrates an example processor-based system with which some aspects of the subject technology can be implemented, according to some examples of the present disclosure.

FIG. 8 illustrates an example processor-based system with which some aspects of the subject technology can be implemented. For example, processor-based system 800 can be any computing device making up, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (Central Processing Unit (CPU) or processor) 810 and connection 805 that couples various system components including system memory 815, such as Read-Only Memory (ROM) 820 and Random-Access Memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 830 can include software services, servers, services, etc., that when the code that defines such software is executed by the processor 810, it causes the system 800 to perform a function. In some embodiments, a hardware service that performs a particular function can include the software component stored in a computer-readable medium in connection with the necessary hardware components, such as processor 810, connection 805, output device 835, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A method comprising: accessing sensor data gathered by one or more floor weight sensors of a vehicle, identifying a weight associated with an object in the vehicle from the sensor data, monitoring a weight distribution on a floor of a vehicle from the sensor data, identifying a reference location of the object within the vehicle based on both the weight associated with the object and the weight distribution on the floor of the vehicle, and tracking a location of the object relative to the reference location within the vehicle based on both the weight associated with the object and the weight distribution on the floor of the vehicle.

Aspect 2. The method of Aspect 1, wherein the reference location of the object is within a container secured to the floor of the vehicle and the tracked location of the object include removal of the object from the container and out of an exit of the vehicle.

Aspect 3. The method of Aspects 1 through 2, wherein the container is configured to store multiple objects and the vehicle is configured to deliver the objects to one or more delivery locations.

Aspect 4. The method of Aspects 1 through 3, further comprising: identifying a pattern of movement of the occupant in the vehicle from the tracked location of the occupant relative to the reference location, and determining a behavior of the occupant in association with the vehicle based on the pattern of movement.

Aspect 5. The method of Aspects 1 through 4, wherein the vehicle is an autonomous vehicle and the method further comprising controlling operation of the autonomous vehicle based on the behavior of the occupant in association with the vehicle.

Aspect 6. The method of Aspects 1 through 5, further comprising: comparing the pattern of movement of the occupant in the vehicle with patterns of movements of occupants in vehicles associated with the vehicle, and detecting abnormalities in the behavior of the occupant in relation to behaviors of the occupants based on a comparison of the pattern of movement of the occupant in the vehicle with the patterns of movements of the occupants in the vehicles associated with the vehicle.

Aspect 7. The method of Aspects 1 through 6, further comprising: accessing additional sensor data of one or more other types of sensors of the vehicle with respect to the one or more floor weight sensors, and tracking the location of the object relative to the reference location within the vehicle based on both the sensor data and the additional sensor data.

Aspect 8. The method of Aspects 1 through 7, further comprising determining a stability of the object within the vehicle based on the tracked location of the object relative to the reference location.

Aspect 9. The method of Aspects 1 through 8, wherein the vehicle is an autonomous vehicle and the method further comprising controlling operation of the autonomous vehicle based on the stability of object within the autonomous vehicle.

Aspect 10. The method of Aspects 1 through 9, wherein the one or more floor weight sensors include a plurality of force sensors spaced at known locations corresponding to defined spatial subsets of the floor of the vehicle.

Aspect 11. A system comprising: one or more floor weight sensors of a vehicle configured to gather sensor data; one or more processors; and at least one computer-readable storage medium having stored therein instructions which, when executed by the one or more processors, cause the one or more processors to: identify a weight associated with an object in the vehicle from the sensor data, monitor a weight distribution on a floor of a vehicle from the sensor data, identify a reference location of the object within the vehicle based on both the weight associated with the object and the weight distribution on the floor of the vehicle, and track a location of the object relative to the reference location within the vehicle based on both the weight associated with the object and the weight distribution on the floor of the vehicle.

Aspect 12. The method of Aspect 11, wherein the one or more floor weight sensors include a plurality of force sensors spaced at known locations corresponding to defined spatial subsets of the floor of the vehicle.

Aspect 13. The method of Aspects 11 through 12, wherein the one or more floor weight sensors include one or more scanning sensors.

Aspect 14. The method of Aspects 11 through 13, further comprising a camera from which camera data is received.

Aspect 15. The method of Aspects 11 through 14, wherein the one or more processors execute instructions to identify an object type to associated with the object based at least in part on an evaluation of the camera data.

Aspect 16. The method of Aspects 11 through 15, further comprising a light detection and ranging (LIDAR) device from which LIDAR data is received.

Aspect 17. The method of Aspects 11 through 16, wherein the one or more processors execute instructions to identify an object type to associated with the object based at least in part on an evaluation of the LIDAR data.

Aspect 18. The method of Aspects 11 through 17, further comprising one or more seat force sensors configured to identify presence of additional objects on one or more seats of the vehicle.

Aspect 19. The method of Aspects 11 through 18, further comprising a delivery compartment into which the object is placed.

Aspect 20. A non-transitory computer-readable storage medium having stored therein instructions which, when executed by one or more processors, cause the one or more processors to: access sensor data gathered by one or more floor weight sensors of a vehicle, identify a weight associated with an object in the vehicle from the sensor data, monitor a weight distribution on a floor of a vehicle from the sensor data, identify a reference location of the object within the vehicle based on both the weight associated with the object and the weight distribution on the floor of the vehicle, and track a location of the object relative to the reference location within the vehicle based on both the weight associated with the object and the weight distribution on the floor of the vehicle.

What is claimed is:

1. A method comprising:
accessing first sensor data captured by one or more floor weight sensors of a vehicle at a first time;
identifying a weight associated with an object in the vehicle from the first sensor data;
identifying a weight distribution on a floor of the vehicle associated with the object from the first sensor data;
identifying a reference location of the object on the floor of the vehicle at the first time based on the weight and the weight distribution identified from the first sensor data;
accessing second sensor data captured by the one or more floor weight sensors at a second time;
identifying a second location of the object on the floor of the vehicle at the second time based on the weight, the weight distribution, and the second sensor data; and
tracking movement of the object relative to the reference location within the vehicle based on the weight distribution, the reference location, the second location, the first time, and the second time.

2. The method of claim 1, wherein the reference location of the object is within a container secured to the floor of the vehicle and the tracking of the movement of the object includes tracking removal of the object from the container and out of an exit of the vehicle.

3. The method of claim 2, wherein the container is configured to store multiple objects and the vehicle is configured to deliver the multiple objects to one or more delivery locations.

4. The method of claim 1, wherein the object is an occupant of the vehicle, the method further comprising:
identifying a pattern of movement of the occupant in the vehicle from the tracked movement of the occupant relative to the reference location; and
determining a behavior of the occupant in association with the vehicle based on the pattern of movement.

5. The method of claim 4, wherein the vehicle is an autonomous vehicle, and the method further comprising controlling operation of the autonomous vehicle based on the behavior of the occupant in association with the vehicle.

6. The method of claim 4, further comprising:
comparing the pattern of movement of the occupant in the vehicle with patterns of movements of occupants in vehicles associated with the vehicle; and detecting abnormalities in the behavior of the occupant in relation to behaviors of the occupants based on a comparison of the pattern of movement of the occupant in the vehicle with the patterns of movements of the occupants in the vehicles associated with the vehicle.

7. The method of claim 1, further comprising:

accessing additional sensor data of one or more other types of sensors of the vehicle with respect to the one or more floor weight sensors; and tracking the movement of the object relative to the reference location within the vehicle based on both the first sensor data and the additional sensor data.

8. The method of claim 1, further comprising determining a stability of the object within the vehicle based on the tracked movement of the object relative to the reference location.

9. The method of claim 8, wherein the vehicle is an autonomous vehicle, and the method further comprises controlling operation of the autonomous vehicle based on the stability of the object within the autonomous vehicle.

10. The method of claim 1, wherein the one or more floor weight sensors include a plurality of force sensors spaced at known locations corresponding to defined spatial subsets of the floor of the vehicle.

11. A system comprising:

one or more floor weight sensors of a vehicle configured to capture sensor data;

one or more processors; and at least one computer-readable storage medium having stored therein instructions which, when executed by the one or more processors, cause the one or more processors to:

access first sensor data captured by the one or more floor weight sensors of the vehicle at a first time;

identify a weight associated with an object in the vehicle from the first sensor data;

identify a weight distribution on a floor of the vehicle associated with the object from the first sensor data;

identify a reference location of the object on the floor of the vehicle at the first time based on the weight and the weight distribution identified from the first sensor data;

access second sensor data captured by the one or more floor weight sensors at a second time;

identify a second location of the object on the floor of the vehicle at the second time based on the weight, the weight distribution, and the second sensor data; and track movement of the object relative to the reference location within the vehicle based on the weight distribution, the reference location, the second location, the first time, and the second time.

12. The system of claim 11, wherein the one or more floor weight sensors include a plurality of force sensors spaced at known locations corresponding to defined spatial subsets of the floor of the vehicle.

13. The system of claim 11, wherein the one or more floor weight sensors include one or more scanning sensors.

14. The system of claim 11, further comprising:

a camera from which camera data is received.

15. The system of claim 14, wherein the instructions also cause the one or more processors to identify an object type to associate with the object based at least in part on an evaluation of the camera data.

16. The system of claim 11, further comprising:

a light detection and ranging (LIDAR) device from which LIDAR data is received.

17. The system of claim 16, wherein the instructions also cause the one or more processors to identify an object type to associate with the object based at least in part on an evaluation of the LIDAR data.

18. The system of claim 11, further comprising:

one or more seat force sensors configured to identify presence of additional objects on one or more seats of the vehicle.

19. The system of claim 11, further comprising:

a delivery compartment into which the object is placed.

20. A non-transitory computer-readable storage medium having stored therein instructions which, when executed by one or more processors, cause the one or more processors to:

access first sensor data captured by one or more floor weight sensors of a vehicle at a first time;

identify a weight associated with an object in the vehicle from the first sensor data;

identify a weight distribution on a floor of the vehicle associated with the object from the first sensor data;

identify a reference location of the object on the floor of the vehicle at the first time based on the weight and the weight distribution identified from the first sensor data;

access second sensor data captured by the one or more floor weight sensors at a second time;

identify a second location of the object on the floor of the vehicle at the second time based on the weight, the weight distribution, and the second sensor data; and track movement of the object relative to the reference location within the vehicle based on the weight distribution, the reference location, the second location, the first time, and the second time.

* * * * *